(12) United States Patent
Kato

(10) Patent No.: US 8,660,998 B2
(45) Date of Patent: Feb. 25, 2014

(54) DUPLICATE FILE DETECTION DEVICE, DUPLICATE FILE DETECTION METHOD, AND COMPUTER-READABLE STORAGE MEDIUM

(75) Inventor: Kyoko Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/422,993

(22) Filed: Mar. 16, 2012

(65) Prior Publication Data

US 2012/0246125 A1 Sep. 27, 2012

(30) Foreign Application Priority Data

Mar. 23, 2011 (JP) ................................. 2011-063477

(51) Int. Cl.
*G06F 17/00* (2006.01)
*G06F 17/30* (2006.01)
(52) U.S. Cl.
CPC ............................... *G06F 17/30067* (2013.01)
USPC ........................... 707/692; 707/812; 707/821
(58) Field of Classification Search
CPC ............................................... G06F 17/30067
USPC .............................................................. 707/692
See application file for complete search history.

(56) References Cited

U.S. PATENT DOCUMENTS

| 6,547,829 | B1 * | 4/2003 | Meyerzon et al. ............ 715/234 |
| 6,658,423 | B1 * | 12/2003 | Pugh et al. ............................... 1/1 |
| 7,401,080 | B2 * | 7/2008 | Benton et al. ................. 707/692 |
| 7,627,613 | B1 * | 12/2009 | Dulitz et al. ........................... 1/1 |
| 7,900,000 | B2 * | 3/2011 | Nakamura et al. ............ 711/156 |
| 8,127,109 | B2 * | 2/2012 | Matze ............................. 711/216 |
| 8,140,505 | B1 * | 3/2012 | Jain et al. ....................... 707/706 |
| 8,156,092 | B2 * | 4/2012 | Hewett et al. ................. 707/698 |
| 8,238,549 | B2 * | 8/2012 | Volkoff et al. .................. 380/28 |
| 8,380,681 | B2 * | 2/2013 | Oltean et al. .................. 707/692 |
| 2007/0050423 | A1 * | 3/2007 | Whalen et al. ................ 707/200 |
| 2007/0180265 | A1 | 8/2007 | Hiroshi |
| 2008/0276091 | A1 * | 11/2008 | Welin et al. ................... 713/170 |
| 2009/0193521 | A1 | 7/2009 | Matsushima et al. |
| 2010/0142701 | A1 * | 6/2010 | Volkoff et al. .................. 380/28 |
| 2011/0078112 | A1 * | 3/2011 | Takata et al. .................. 707/622 |
| 2011/0099154 | A1 * | 4/2011 | Maydew et al. .............. 707/692 |

FOREIGN PATENT DOCUMENTS

JP 2007-201861 A 8/2007
WO WO 2006/129654 A1 12/2006

* cited by examiner

*Primary Examiner* — Miranda Le
(74) *Attorney, Agent, or Firm* — McGinn IP Law Group, PLLC

(57) ABSTRACT

A duplicate file detection device 100 has a storage unit 101, a calculation unit 102, and a detection unit 103. The storage unit 101 stores calculation information that defines data used in the calculation of the hash values of files in association with the extensions of the files. The calculation unit 102 acquires the calculation information associated with the extension of each file to be examined from the storage unit 101 and uses the acquired calculation information to calculate the hash value of each file to be examined. The detection unit 103 detects duplicated files by comparing the hash values of the files to be examined that are calculated by the calculation unit 102.

12 Claims, 12 Drawing Sheets

Fig.4

| File ID | File Path | Type | Size | Date/time updated | Hash Value |
|---|---|---|---|---|---|
| 0000001 | \\server1\01\file1.txt | text | 1024 | 11/01/2010 10:00:00 | B135124DEFFAE233048C4186A4A3B139 |
| 0000002 | \\server1\01\file2.jpg | jpeg | 23850 | 12/22/2009 09:00:00 | A5B678F05EC23F2776ED23733ACEC9C2 |
| 0000003 | \\server1\01\file3.doc | word | 130048 | 02/15/2007 18:00:00 | 51C6CAA6195E711510930D9C38B409BD6 |
| ... | ... | ... | ... | ... | ... |

Fig.5

```
<?xml version="1.0" encoding=UTF-8"?>
<items>
    <item type="text">
        </extensions>
            <extension>txt</extension>
            <extension>text</extension>
        </extensions>
        <samplings>
            <sampling condition="0-10240" range="all"/>
            <sampling condition="10240-" range="part">
                <regular block="1024" interval="10240"/>
            </sampling>
        </samplings>
    </item>
    <item type="jpeg">
        <extensions>
            <extension>jpg</exension>
            <extension>jpeg</exension>
        </extensions>
        <samplings>
            <sampling range="part">
                <head>10240</head>
                <!--<middle start="10">10240</middle>-->
                <!--<tai>10240</tail>-->
            <sampling>
        </samplings>
    </item>
        •
        •
        •
<items>
```

DUPLICATE FILE DETECTION DEVICE, DUPLICATE FILE DETECTION METHOD, AND COMPUTER-READABLE STORAGE MEDIUM

CROSS-REFERENCE TO RELATED APPLICATION

This application is based upon and claims the benefit of priority from Japanese patent application No. 2011-063477, filed on Mar. 23, 2011, the disci of which is incorporated herein in its entirety by reference.

BACKGROUND OF THE INVENTION

1. Field of the Invention

The present invention relates to a duplicate file detection device and a duplicate file detection method used for detecting duplicated files, as well as to a computer-readable storage medium having recorded thereon a software program used for implementing the same.

2. Background Art

Well-known methods of detecting duplicated files have heretofore included a method, in which detection is accomplished by comparing file meta-information (time stamps, size, etc.), and a method, in which detection is accomplished based on comparing file contents (binary data, extracted text data, etc.).

Of these, the method of detection based on comparing file meta-information is subject to the possibility of actually non-duplicate files being falsely detected as duplicated files. By contrast, in the method where the determination of duplicates is accomplished by comparing file contents, the likelihood of false detection is lower. However, in the method where the determination of duplicates is accomplished by comparing file contents, time may be required for direct comparison of source data during detection.

For this reason, in order to reduce processing time in the method where detection is accomplished by comparing file contents, it has been proposed to compute hash values from the source data calculated using algorithms such as MD5 (Message Digest Algorithm 5) and SHA (Secure Hash Algorithm) etc. and make judgments about the presence or absence of duplicates based on the comparison.

However, even when comparison is performed using hash values, considerable time is required for the file loading process alone if the hash values are calculated based on complete files. For this reason, in the method disclosed in JP 2007-201861A and WO2006/129654, time reduction is achieved by calculating hash values from a portion of the data in the files.

For example, JP 2007-201861A has disclosed a method of detecting duplicate image files using hash values. In the method disclosed in JP 2007-201861A, identification of image files of matching file sizes is performed as the first step in the determination of image file equivalency. Subsequently, if image files of matching sizes are present, partial hash values that summarize the respective beginning portions of said image files are computed and these values are compared. Then, if there is a match between the partial hash values, full hash values that summarize the files in their entirety are respectively computed for said image files and these values are compared.

In addition, WO2006/129654 has disclosed a method, in which alterations made during file updates are detected using hash values. In the method disclosed in WO2006/129654, files are first segmented into blocks of a predetermined size and hash values are calculated for the resultant block units. Next, the hash values of some blocks are compared and file alterations are detected based on the result of the comparison.

However, the method of calculating hash values based on the data of specific portions, as disclosed in these documents, is effective only when examining files of a limited number of types and the problem with this method is that it cannot be applied when examining files of various types. The reason is that the locations that are modified when the files are updated are not the same in files of all types.

SUMMARY OF THE INVENTION

An exemplary object of the present invention is to eliminate the above-described problems and provide a duplicate file detection device, a duplicate file detection method, and a computer-readable storage medium that enable duplicate file detection to be performed even when files of various types are present as the files to be examined.

In order to attain the above-described object, a duplicate file detection device according to an exemplary aspect of the present invention comprises:

a storage unit that stores information defining data used in the calculation of the hash values of files in association with the extensions of the files;

a calculation unit that acquires the information associated with the extensions of the respective multiple files to be examined from the storage unit and uses the acquired information to calculate the hash values of the respective multiple files to be examined; and a detection unit that detects duplicated files by comparing the hash values of the respective multiple files to be examined that are calculated by the calculation unit.

In addition, in order to attain the above-described object, a duplicate file detection method according to an exemplary aspect of the present invention comprises the steps of:

(a) storing information that defines data used in the calculation of the hash values of the files in association with the extensions of the files;

(b) acquiring the information associated with the extensions of the respective multiple files to be examined and using the acquired information to calculate the hash values of the respective multiple files to be examined; and (c) detecting duplicated files by comparing the hash values of the respective multiple files to be examined that are calculated in Step (b) above.

In addition, in order to attain the above-described object, a computer-readable storage medium according to an exemplary aspect of the present invention has recorded thereon a software program containing instructions that direct a computer to execute the steps of:

(a) storing information that defines data used in the calculation of the hash values of the files in association with the extensions of the files;

(b) acquiring the information associated with the extensions of the respective multiple files to be examined and using the acquired information to calculate the hash values of the respective multiple files to be examined; and (c) detecting duplicated files by comparing the hash values of the respective multiple files to be examined that are calculated in Step (b) above.

As described above, by the present invention, it is made possible to perform duplicate file detection even when files of various types are present as the files to be examined.

BRIEF DESCRIPTION OF THE DRAWINGS

FIG. 4 is a diagram illustrating an example of the information stored in the management database used in Embodiment 2 of the present invention.

FIG. 5 is a diagram illustrating an exemplary file type definition used in Embodiment 2 of the present invention.

EXEMPLARY EMBODIMENTS

Embodiment 1

Figure 1:
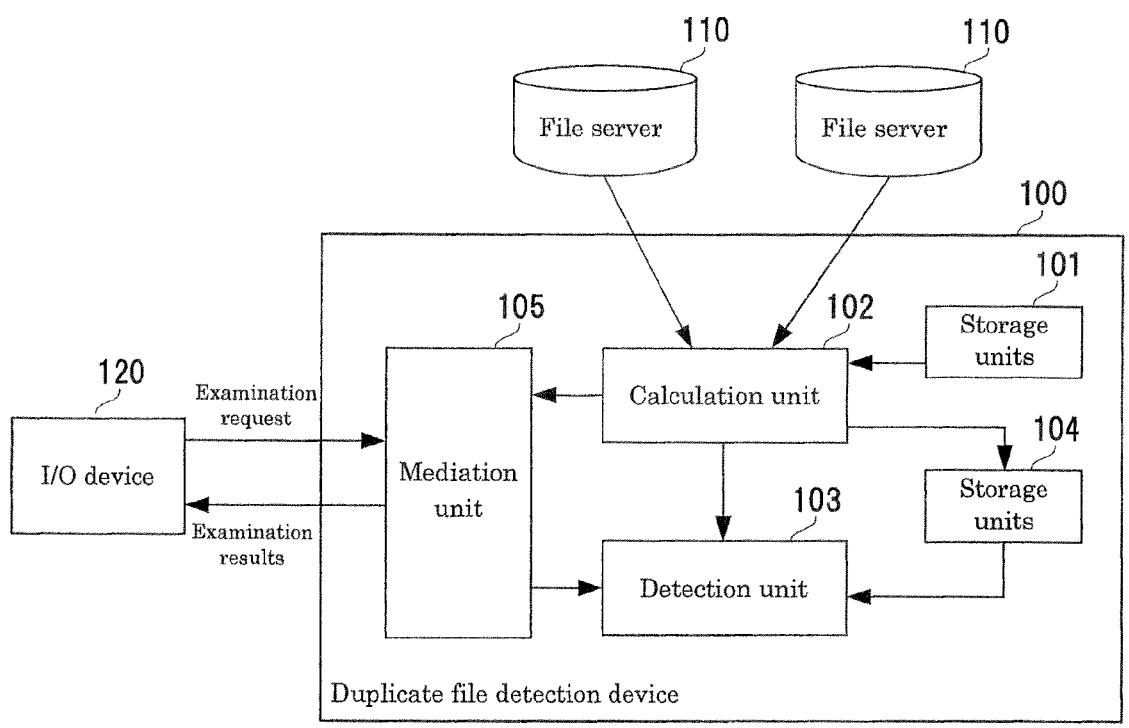
FIG. 1 is a block diagram illustrating the configuration of the duplicate file detection device used in Embodiment 1 of the present invention.

The duplicate file detection device, duplicate file detection method, and software program used in Embodiment 1 of the present invention will be first described with reference to FIG. 1 and FIG. 2.
[Device Configuration]

First of all, the configuration of the duplicate file detection device used in Embodiment 1 will be described with reference to FIG. 1. As shown in FIG. 1, a duplicate file detection device 100 according to Embodiment 1 of the present invention has a storage unit 101, a calculation unit 102, and a detection unit 103.

The storage unit 101 stores information that defines data used in the calculation of the hash values of files (hereinafter referred to as "calculation information") in association with the extensions of the files.

In Embodiment 1, the data used in the calculation of the hash values of the files preferably includes data that is modified when the corresponding files are updated. For example, when using files, in which the data in the vicinity of the beginning of the files is always updated when they are updated, the data used in the calculation of the hash values of the files is preferably data located in the vicinity of the beginning of the files.

In addition, when using files that do not have a fixed location that is always updated when they are updated, the data used in the calculation of the hash values of the files is preferably data from more than one portion of the files.

In addition, in Embodiment 1, the data used in the calculation of the hash values of the files may be different for each extension with which the calculation information that defines it is associated. Namely, the data defined by the calculation information associated with the extension of at least one file may be different from the data defined by the calculation information associated with the extension of at least one other file.

In addition, in Embodiment 1, the storage unit 101 can store calculation information defined as a complete file as calculation information to be used when the data size of the file does not exceed a threshold value. Furthermore, the storage unit 101 can store calculation information defined as a specific portion of all the data in the file as calculation information to be used when the data size of the file exceeds a threshold value.

First of all, the calculation unit 102 acquires the calculation information associated with the extensions of the respective multiple files to be examined from the storage unit 101. The calculation unit 102 then uses the acquired calculation information to calculate the hash values of the respective multiple files to be examined. In Embodiment 1, the algorithms used to calculate the hash values are not particularly limited. The calculation unit 102 can calculate the hash values using hash functions such as MD5 (Message Digest 5) and SHA (Secure Hash Algorithm).

In addition, in Embodiment 1, the multiple files to be examined may be acquired each time processing takes place from one, two, or more file servers 110. In addition, they may be acquired in advance from the file servers 110 and imported into the duplicate file detection device 100.

The detection unit 103 detects duplicated files by comparing the hash values of the respective multiple files to be examined that are calculated by the calculation unit 102.

In this manner, the files to be examined are hashed in an optimum manner in accordance with their extensions in the duplicate file detection device 100 and duplicate file detection is then carried out based on the resultant hash values. For this reason, the duplicate file detection device 100 makes it possible to perform duplicate file detection even when files of various types are present as the files to be examined.

In addition, in Embodiment 1, the duplicate file detection device 100 can be equipped with a storage unit 104 in addition to the storage unit 101. The storage unit 104 stores calculation results, i.e. the hash values of the respective multiple files to be examined that are calculated by the calculation unit 102. The storage unit 104 is used to transfer the calculation results from the calculation unit 102 to the detection unit 103.

At such time, in addition to the hash values of the respective multiple files to be examined, the calculation unit 102 can also store their respective identifiers, file paths, extensions, sizes, and last-updated dates and times in the storage unit 104. To detect duplicated files, the detection unit 103 carries out a comparison process using the hash values of the respective multiple files to be examined that are stored in the storage unit 104.

In addition, in Embodiment 1, the duplicate file detection device 100 can be equipped with a mediation unit 105, which operates as an interface for external I/O devices 120. When an examination request is transmitted from the I/O device 120, the mediation unit 105 receives it and sends the received examination request to the calculation unit 102. The examination request contains information regarding the file servers 110 that hold the multiple files to be examined.

In such a case, the calculation unit 102 acquires the multiple files to be examined from the file servers identified in the examination request and calculates hash values for the acquired files. In addition, upon detection of duplicated files, the detection unit 103 sends the detection results to the mediation unit 105. The mediation unit 105 returns examination results, which contain the detection results sent from the detection unit 103, to the I/O device 120.

It should be noted that the I/O device 120 is a piece of terminal equipment utilized by a user, which is connected to the duplicate file detection device 100 via a network (not shown in FIG. 1).

[Device Operation]

Next, the operation of the duplicate file detection device 100 used in Embodiment 1 will be described with reference to FIG. 2. In the description that follows, please refer to FIG. 2 as appropriate. In addition, in Embodiment 1, the duplicate file detection method is carried out by operating the duplicate file detection device 100. Accordingly, a description of the operation of the duplicate file detection device 100, which is provided below, is used instead of a description of the duplicate file detection method.

First of all, the user enters an examination request on the I/O device 120. The examination request contains information regarding the file servers 110 that hold the multiple files to be examined. The I/O device 120 then transmits the examination request to the duplicate file detection device 100. Thus, as shown in FIG. 2, the mediation unit 105 receives the examination request and supplies the received examination request to the calculation unit 102 (Step A1).

Next, the calculation unit 102 accesses the file servers 110 and acquires the multiple files to be examined in accordance with the information contained in the examination request (Step A2). Subsequently, the calculation unit 102 acquires calculation information from the storage unit 101 and calculates the hash value of each file acquired in Step A2 using the acquired calculation information (Step A3).

Specifically, first of all, the calculation unit 102 reads out the meta-information of the multiple files to be examined from the file servers 110 and identifies the extensions that indicate the type of each file. Next, the calculation unit 102 reads out the calculation information that corresponds to the identified extensions from the storage unit 101 and identifies the data serving as a basis for the calculation of the hash values of the files having these extensions based on the calculation information it has read. Furthermore, the calculation unit 102 reads out the identified data from each file held by the file servers 110.

The calculation unit 102 then calculates the hash values by applying a hash function used for hash value calculation to the data it has read. In addition, when calculating the hash values, the calculation unit 102 stores the hash values obtained by calculation along with the identifiers, etc. of each file to be examined in the storage unit 104. After that, the calculation unit 102 instructs the detection unit 103 to start the detection process.

Next, the detection unit 103 reads out the hash value of each file to be examined from the storage unit 104 and performs a comparison between them and detects files, for which the result of the comparison indicates a match between their hash values, as duplicate files (Step A4). In addition, the detection unit 102 sends the detection results to the mediation unit 105.

Next, upon receiving the detection results, the mediation unit 105 generates examination results containing the detection results and transmits them to the I/O device 120 (Step A5). This allows the user to receive the examination results on the I/O device 120.

[Effects]

Thus, in accordance with Embodiment 1, even when files of various types are present as the multiple files to be examined, duplicate files are detected in a reliable manner because the hash values are calculated from partial data appropriate to the type of each file.

[Software Program]

Figure 2:
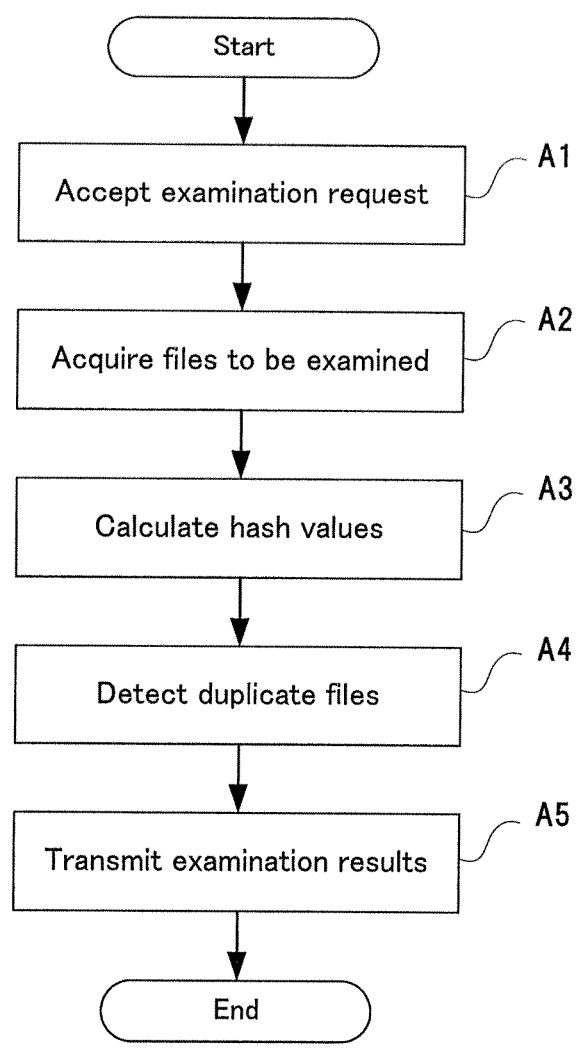
FIG. 2 is a flow chart illustrating the operation of the duplicate file detection device used in Embodiment 1 of the present invention.

The software program used in Embodiment 1 may be any software program directing a computer to execute Steps A1 to A5 shown in FIG. 2. The duplicate file detection device 100 and duplicate file detection method used in Embodiment 1 can be implemented by installing and running this software program on the computer. In such a case, the CPU (Central Processing Unit) of the computer operates and performs processing as the calculation unit 102, detection unit 103, and mediation unit 105. In addition, the hard disk drive and other storage devices installed in the computer operate as the storage unit 101 and storage unit 104.

Embodiment 2

Next, the duplicate file detection device, duplicate file detection method, and software program used in Embodiment 2 of the present invention will be described with reference to FIGS. 3 to 6.

[Summary]

In Embodiment 2, the duplicate file detection device can take file characteristics into consideration when detecting duplicate files held by the file servers, thereby permitting a considerable reduction in the examination time required for detection while maintaining the accuracy of duplicate detection.

In other words, in Embodiment 2, the duplicate file detection device acquires information about files stored on a group of file servers subject to examination. Then, in order to detect duplicated files among these files, the duplicate file detection device calculates hash values summarizing the information of each file and determines that the group of files having mutually matching hash values represents duplicate files.

At such time, in Embodiment 2, the duplicate file detection device can appropriately set data employed in hash value calculation for files with different characteristics, for example, for files with different locations modified when the files are updated. Consequently, as described above, the duplicate file detection device can greatly reduce the examination time required for detection while maintaining the accuracy of duplicate detection to the extent possible.

[Device Configuration]

Figure 3:
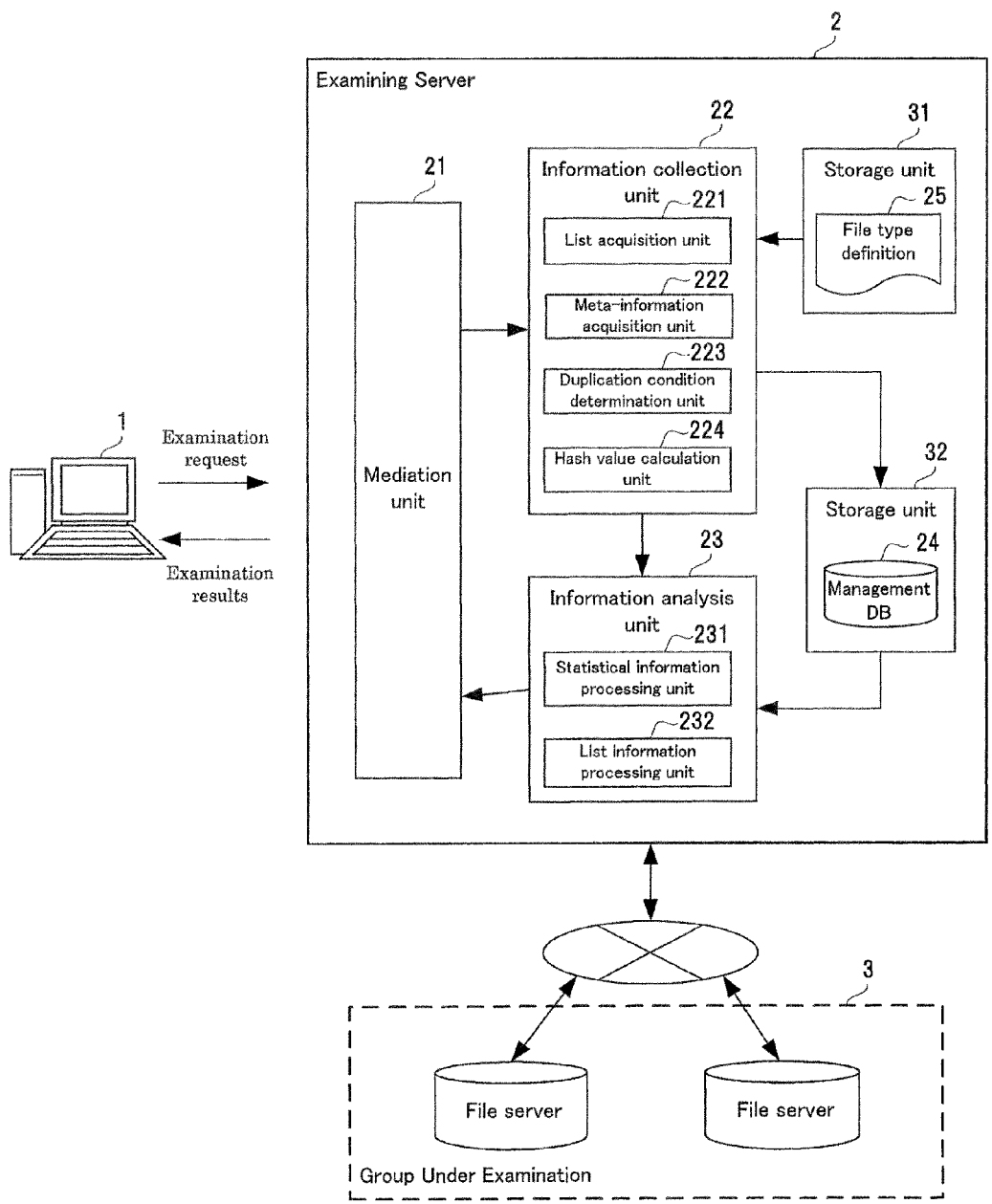
FIG. 3 is a block diagram illustrating the configuration of the examining server used as a duplicate file detection device in Embodiment 2 of the present invention.

Next, the configuration of the duplicate file detection device used in Embodiment 2 will be described with reference to FIGS. 3 to 5. As shown in FIG. 3, in Embodiment 2, an Examining Server 2 operates as a duplicate file detection device. In addition, the Examining Server 2 forms a single system with the 110 device 1 utilized by the user and the Group Under Examination 3.

As shown in FIG. 3, the Group Under Examination 3 is made up of one, two or more file servers that store various text and image files (shared storage).

In FIG. 3, the I/O device 1, in the same manner as the I/O device 120 illustrated in FIG. 1, is a piece of terminal equipment utilized by the user. The I/O device 1 is equipped with a keyboard, a display, etc.

The Examining Server 2 is a device which, upon receiving an examination request from the I/O device 1, examines the storage status of the data on the file servers constituting the Group Under Examination 3 and returns examination results that contain duplicate file detection results, and the like.

As shown in FIG. 3, the Examining Server 2 comprises a mediation unit 21, an information collection unit 22, an information analysis unit 23, and storage units 31 and 32. In addition, file type definitions 25 are stored in the storage unit 31. A management database 24 is built into the storage unit 32.

The mediation unit 21 receives examination requests from the I/O device 1 and returns examination results to the I/O device 1.

The information collection unit 22 has the ability to collect information on the files stored on the file servers and the ability to calculate the hash values of the respective multiple files to be examined. In other words, the information collection unit 22 can carry out the same type of processing as the calculation unit 102, which was described with reference to FIG. 1 in Embodiment 1, and operates as a "calculation unit".

Specifically, as shown in FIG. 3, the information collection unit 22 is equipped with a list acquisition unit 221, meta-information acquisition unit 222, duplication condition determination unit 223, and hash value calculation unit 224. In addition, the information collection unit 22 outputs the collected information to the storage unit 32 and causes it to be held in a management database (hereinafter referred to as the "management DB") 24.

The list acquisition unit 221 acquires the folder lists and file lists stored on the file servers constituting the Group Under Examination 3. In Embodiment 2, the files stored by each file server are the files to be examined.

The meta-information acquisition unit 222 refers to the folder lists and file lists and acquires the meta-information of the files stored on each file server constituting the Group Under Examination 3.

The duplication condition determination unit 223 uses the file type definitions 25 to determine the data used in hash value calculation for the purpose of duplicate determination based on the characteristics of the files to be examined. The duplication condition determination unit 223 determines items such as file meta-information, specific portions (part) of all the data in the files, complete files, etc., as data used for hash value calculation.

For each file to be examined, the hash value calculation unit 224 identifies the data determined by the duplication condition determination unit 223 and calculates the hash value of the identified data.

The management DB 24 in the storage unit 32 holds the file information, etc., collected by the information collection unit 22. An example of the information held in the management DB 24 is represented in tabular format in FIG. 4. In the example of FIG. 4, file IDs, file paths, types, sizes, last-updated dates/times, and hash values are maintained for every file subject to examination. It should be noted that the storage unit 32 corresponds to the storage unit 104 illustrated in FIG. 1 in Embodiment 1.

Additionally, in Embodiment 2, in order to permit maintenance and retrieval of information, the storage unit 32 holds information collected by the information collection unit 22 in the form of a database, but there is no limitation to this. The storage unit 32 may have any means permitting information maintenance and retrieval. For example, it may have an index, etc., instead of a database.

The file type definitions 25 define data used in hash value calculation for each file type and include multiple "calculation information" items described in Embodiment 1. In addition, in the file type definitions 25, the file types, the extensions corresponding thereto, and the data used in hash value calculation, etc., are defined as file type-related information in accordance with a method pre-defined in the system. The following data are suggested as data used in hash value calculation.

(a) filename
(b) file extension
(c) file size
(d) date/time the file was last updated
(e) complete file data
(f) N bytes of data from the beginning of the file
(g) N bytes of data from the end of the file
(h) N bytes of data from the Sth byte of the file
(i) data obtained by extracting N bytes at I-byte intervals from the file
(j) N bytes of data extracted from each data segment obtained by segmenting the file into D segments In addition, in the file type definitions 25, one file extension may be associated with one of the above-described conditions (a) to (j) or with a combination of multiple conditions. Furthermore, the file type definitions 25 may be configured to permit switching data employed in hash value calculation depending on conditions such as whether file size, etc., exceeds a threshold value.

Here, specific examples of the file type definitions 25 will be described with reference to FIG. 5. FIG. 5 illustrates an exemplary file type definition 25 in xml format. In addition, FIG. 5 illustrates cases, in which the extension is "text", and cases, in which it is "jpeg".

First of all, in the case of JPEG image files with a "jpeg" extension, the files contain thumbnail information in the vicinity of the beginning. For this reason, during hash value calculation, an approach that makes use of partial data from the beginning rather than partial data from the middle or partial data from the end is more effective in the determination of duplicate files.

On the other hand, in the case of text files with a "text" extension, there is no header information. For this reason, when hash values are calculated using data extracted from the beginning of text files, such text files and text files having contents appended at the end may end up mistaken for duplicates.

In addition, when the hash values are calculated using data extracted from the end of text files, such text files and text files having a character string inserted in the text or text files having a character string in the text replaced with another may end up mistaken for duplicates.

Therefore, as shown in FIG. 5, the file type definitions 25 are preferably generated in such a manner that data extracted from more than one portion of the files is used for hash value calculation. In addition, the file type definitions 25 are also preferably generated in such a manner that the data used for hash value calculation is modified for each file with different characteristics, specifically, for each file having different locations changed during updates.

In addition, although an xml file encoded in xml is shown in FIG. 5 as an exemplary file type definition 25, in Embodiment 2, the configuration of the file type definition 25 is not particularly limited. For example, the file type definition 25 may be a database.

Furthermore, to avoid generation of false detects during duplicated file detection, it is preferable for the hash values to be calculated using complete files. However, when the size of the files to be calculated is large, the time necessary for loading the data increases and processing requires a longer time. Therefore, it is particularly preferable for the file type definition 25 to be configured in such a manner that the contents of the definition are modified depending on whether processing time or detection accuracy is considered more important.

The information analysis unit 23 has the ability to carry out analytical processing based on the data collected by the information collection unit 22 and detect duplicate files using the results of the analysis. In other words, the information analysis unit 23 can carry out the same type of processing as the detection unit 103 which was described with reference to FIG. 1 in Embodiment 1, and operates as a "detection unit". Specifically, as shown in FIG. 3, the information analysis unit 23 comprises a statistical information processing unit 231 and a list information processing unit 232.

After acquiring the data collected by the information collection unit 22, which is stored in the management DB 24, the statistical information processing unit 231 analyzes it and identifies files with mutually matching hash values as duplicated files. In addition, the statistical information processing unit 231 outputs the number of the duplicated files, the space occupied by each file, and other statistical information to the mediation unit 21.

In addition, in the same manner as the statistical information processing unit 231, the list information processing unit 232 analyzes the data collected by the information collection unit 22 and outputs a list of the duplicated files and detailed information regarding the files to the mediation unit 21.

[Device Operation]

Next, the operation of the duplicate file detection device used in Embodiment 2, i.e. the Examining Server 2, will be described with reference to FIG. 6. In the description that follows, please refer to FIGS. 3 to 5 as appropriate. In addition, in Embodiment 2, the duplicate file detection method is carried out by operating the Examining Server 2. Accordingly, a description of the operation of the Examining Server 2, which is provided below, is used instead of a description of the duplicate file detection method.

First of all, the user enters a file server examination request addressed to the Examining Server 2 on the I/O device 1. The examination request contains information regarding the file servers constituting the Group Under Examination 3. It should be noted that the path to the file servers, on which the examination is initiated, as well as the user IDs and passwords required for access, etc., are suggested as the file server-related information.

Figure 6:
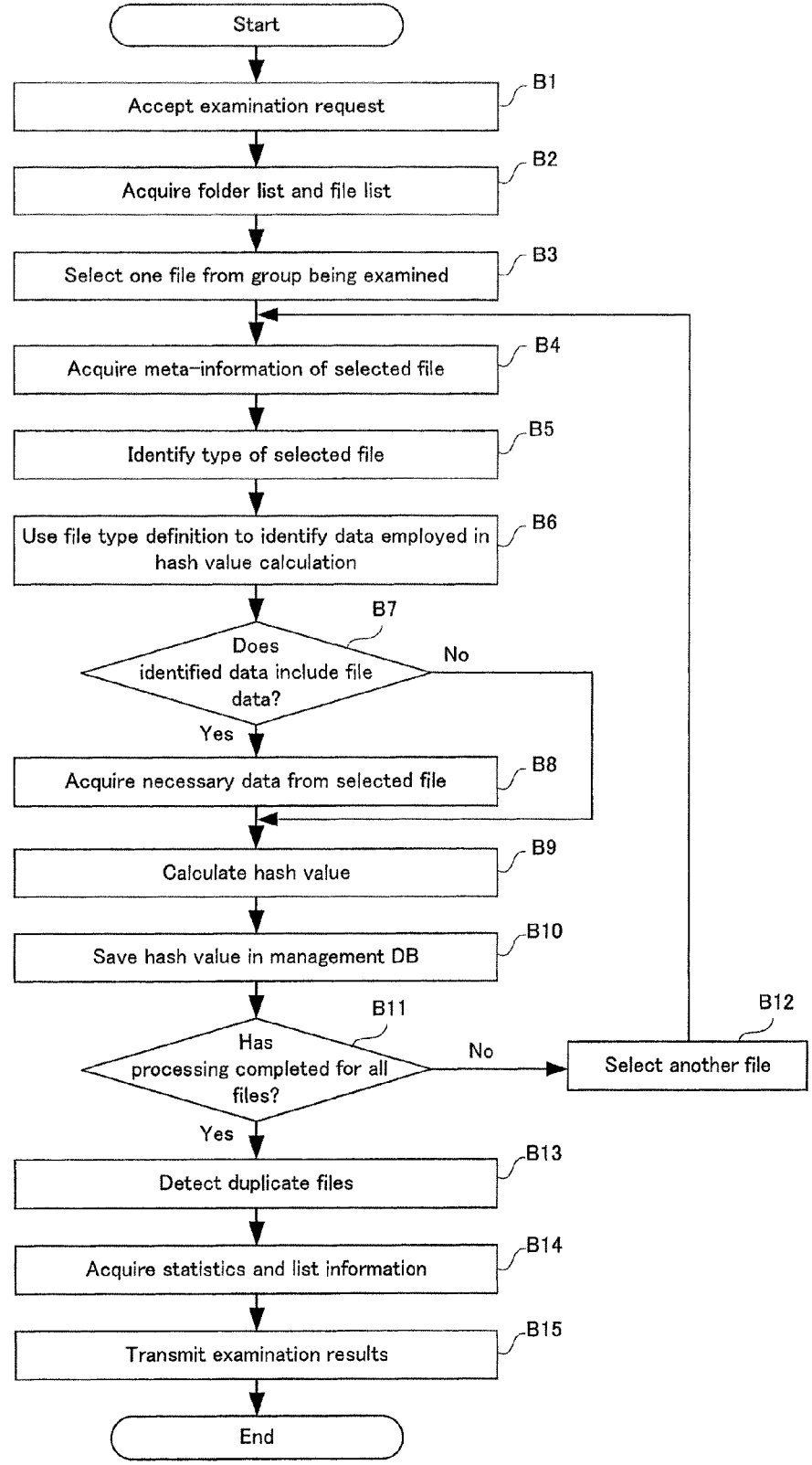
FIG. 6 is a flow chart illustrating the operation of the examining server used as a duplicate file detection device in Embodiment 2 of the present invention.

Then, as shown in FIG. 6, when the I/O device 1 transmits the examination request to the Examining Server 2, the mediation unit 21 in the Examining Server 2 receives the examination request and transfers the received examination request to the information collection unit 22 (Step B1).

Next, the list acquisition unit 221 in the information collection unit 22 acquires the folder lists and file lists stored on the file servers constituting the Group Under Examination 3 (Step B2). It should be noted that the acquired folder lists and fide lists are saved in the management DB 24.

Next, the meta-information acquisition unit 222 selects a single file to be examined by referring to the folder lists and file lists acquired in Step B2 (Step B3). Furthermore, the meta-information acquisition unit 222 acquires the meta-information of the selected file, for example, its filename (extension), file size, last-updated date/time, and the like (Step B4). In addition, in Step B4, the meta-information acquisition unit 222 saves the acquired meta-information in the management DB 24 along with the ID (file ID) identifying the selected file.

Next, the duplication condition determination unit 223 identifies the type and, more specifically, the extension of the file selected in Step B3 based on the meta-information acquired in Step B4 (Step B5). Next, the duplication condition determination unit 223 reads out a file type definition 25 from the storage unit 31 and identifies data to be used in hash value calculation by applying the identified extension thereto (Step B6).

Next, the duplication condition determination unit 223 decides whether the data identified in Step B6 is data (file data) other than the meta-information of the file selected in Step B3 (Step B7).

If as a result of the decision made in Step B7 the data identified in Step B6 is found to be meta-information, the duplication condition determination unit 223 notifies the hash value calculation unit 224 of the fact. As a result, the hash value calculation unit 224 calculates a hash value using the meta-information (Step B9). In addition, the hash value calculation unit 224 saves the calculated hash value in the management DB 24 (Step B10).

On the other hand, if as a result of the decision made in Step B7 the data identified in Step B6 is found to be file data, the duplication condition determination unit 223 accesses the file selected in Step B3 and acquires the data identified in Step B6, for example, complete file data, N bytes of data from the beginning of the file, etc. (Step B8). After that, the duplication condition determination unit 223 transfers the data acquired in Step B8 to the hash value calculation unit 224.

Once Step B8 has been carried out, the hash value calculation unit 224 calculates a hash value using the data transferred from the duplication condition determination unit 223 (Step B9). In this case, the hash value calculation unit 224 also saves the calculated hash value in the management DB 24 (Step B10).

Next, upon completion of Step B10, the meta-information acquisition unit 222 refers to the folder lists and file lists acquired in Step B2 and decides whether processing has completed for all the files to be examined (Step B11).

If as a result of the decision made in Step B11 it is found that processing has not completed for all the files to be examined, the meta-information acquisition unit 222 selects a new file (Step B12). After that, the steps are carried out again starting from Step B4. On the other hand, if as a result of the decision made in Step B11 it is found that processing has completed for all the files to be examined, the information collection unit 22 notifies the information analysis unit 23 of the fact.

Upon receiving the notification from the information collection unit 22, the statistical information processing unit 231 in the information analysis unit 23 accesses the management DB 24, acquires the information saved in Steps B4 and B10, and initiates information analysis. The statistical information processing unit 231 then detects files with mutually matching hash values and identifies them as duplicate files (Step B13).

Next, the statistical information processing unit 231 acquires information such as the number of files with hash values matching those of other files (duplicate file count), individual or total space occupied by the duplicate files (duplicate space), etc., as statistical information (Step B14).

At such time, in order to facilitate analysis by the user on the I/O device 1, the statistical information processing unit 231 can also combine conditions such as folder hierarchy and the type of each file, etc., with the statistical information.

In addition, in Step B14, the list information processing unit 232 acquires a list of the duplicate files and detailed information on each duplicate file, etc. as list information. After that, the information analysis unit 23 outputs the statistical information and list information to the mediation unit 21.

After that, upon receiving the statistical information and list information, the mediation unit 21 generates examination results containing the above-mentioned information and transmits them to the I/O device 1 (Step B15). This allows the user to receive the examination results on the I/O device 1.

Thus, the Examining Server 2 can set data employed in hash value calculation appropriately for each file with different characteristics and, as a result, the examination time required for detection can be greatly reduced while maintaining the accuracy of duplicate detection to the extent possible.

In addition, in Embodiment 2, the file type definition can have a file size threshold value set for each file type. The threshold value used in such a case may be set in advance in the Examining Server 2. It may also be set in response to instructions from the I/O device 1 whenever an examination request is made.

[Effects]

In Embodiment 2, the data used for the hash values of the files can be changed by considering the characteristics of the files, for example, the locations changed during updates and size of the files. Thus, in accordance with Embodiment 2, processing time can be greatly reduced in comparison with duplicate determination based on computing hash values from complete files and, furthermore, duplicate files can be detected in a more appropriate manner in comparison with duplicate determination based on meta-information. In addition, for this reason, Embodiment 2 is particularly effective when applied to files of large file size, files with headers in specific locations, etc., and produces particularly favorable effects when scanning large file servers.

[Software Program]

The software program used in Embodiment 2 may be any software program directing a computer to execute Steps B1 to B15 shown in FIG. 6. The Examining Server 2 and duplicate file detection method used in Embodiment 2 can be implemented by installing and running this software program on the computer. In such a case, the CPU (Central Processing Unit) of the computer operates and performs processing as the information collection unit 22, information analysis unit 23, and mediation unit 21. In addition, the hard disk drive and other storage devices installed in the computer operate as the storage unit 31 and storage unit 32.

Embodiment 3

Next, the duplicate file detection device, duplicate file detection method, and software program used in Embodiment 3 of the present invention will be described with reference to FIGS. 7 to 10. Embodiment 3 differs from Embodiment 2 in its information collection process.

[Device Configuration]

Figure 7:
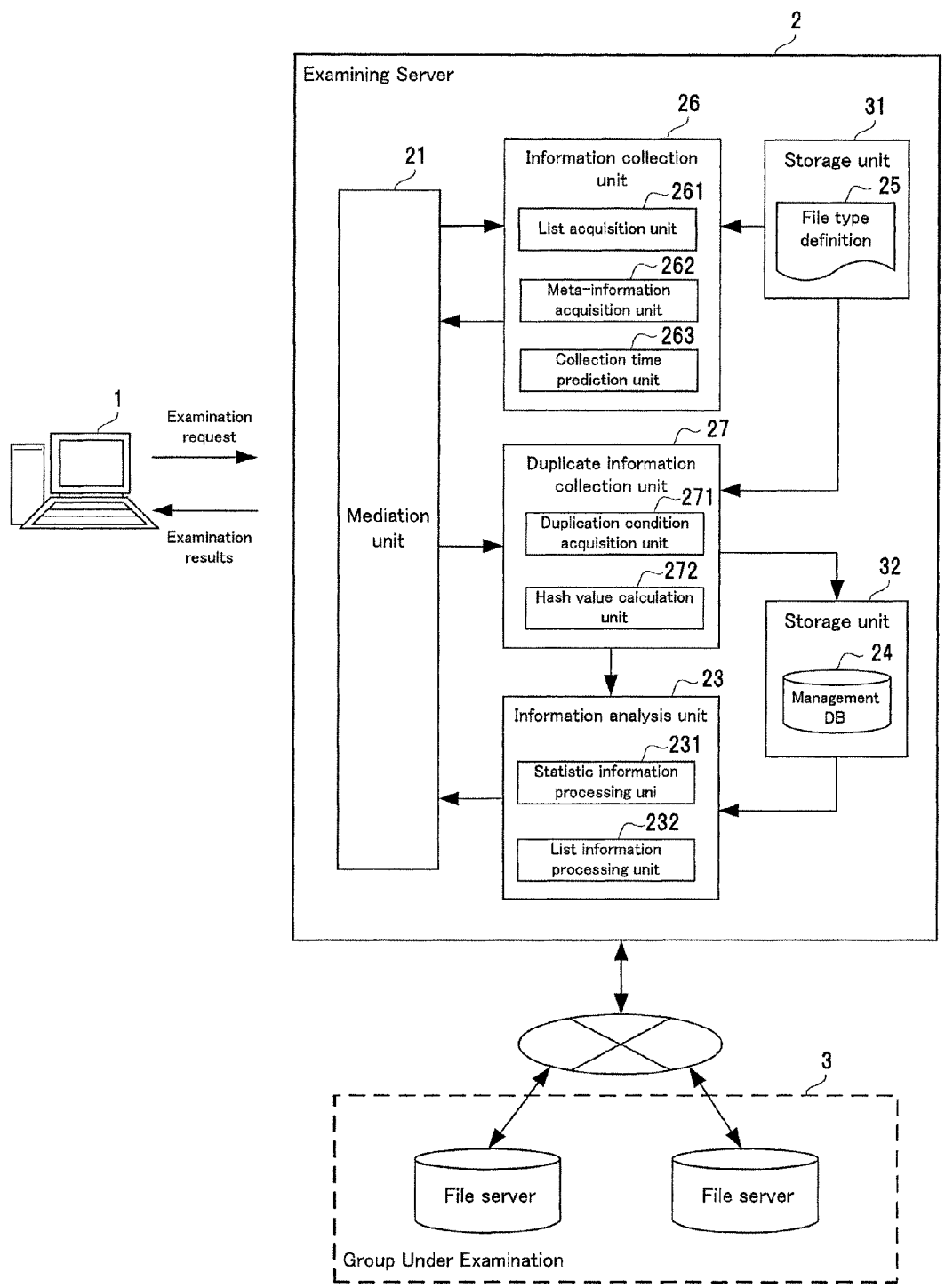
FIG. 7 is a block diagram illustrating the configuration of the examining server used as a duplicate file detection device in Embodiment 3 of the present invention.

First of all, the configuration of the duplicate file detection device used in Embodiment 3 will be described with reference to FIG. 7. As shown in FIG. 7, in Embodiment 3, in the same manner as in Embodiment 2, an Examining Server 4 operates as a duplicate file detection device.

In addition, instead of the information collection unit 22 illustrated in FIG. 3 in Embodiment 2, the Examining Server 4 is equipped with a preliminary information collection unit 26 and a duplicate information collection unit 27. As a result of such an arrangement, the Examining Server 4 enables prediction of duplicate information collection time with considerable variations in processing time according to the set of conditions used and determination of conditions based on use decisions. Embodiment 3 will be described in specific detail below.

First of all, while the mediation unit 21 operates in the same manner as the mediation unit 21 illustrated in FIG. 3, in Embodiment 3, it also receives preliminary examination requests transmitted from the I/O device 1 and returns preliminary examination results.

The preliminary information collection unit 26 has the ability to collect information on the files stored on the file servers and the ability to predict the time taken between hash value computation and duplicate file detection (hereinafter referred to as the "duplicate information collection time") when a preliminary examination request is transmitted from the I/O device 1. As shown in FIG. 7, the preliminary information collection unit 26 comprises a list acquisition unit 261, a meta-information acquisition unit 262, and a collection time prediction unit 263.

In the same manner as the list acquisition unit 221 illustrated in FIG. 3, the list acquisition unit 261 acquires the folder lists and file lists stored on the file servers.

In the same manner as the meta-information acquisition unit 222 illustrated in FIG. 3, the meta-information acquisition unit 262 refers to the folder lists and file lists and acquires the meta-information of each file stored on each file server constituting the Group Under Examination 3.

When a preliminary examination request is transmitted from the I/O device 1, the collection time prediction unit 263 sets one, two, or more computational conditions according to the type of the file and predicts duplicate information collection times for each computational condition. It should be noted that the term "computational conditions" refers to conditions that specify data used for hash value calculation, specifically, the conditions (a) to (j) described in Embodiment 1. In addition, the computational conditions may be specified in advance by the user and may be included in the preliminary examination request.

In addition, the collection time prediction unit 263 notifies the mediation unit 21 of the predicted expected value of the duplicate information collection time. In such a case, the mediation unit 21 returns the expected value to the I/O device 1 as preliminary examination results.

When the preliminary examination results are returned to the I/O device 1, the user determines the computational conditions used for duplicate file detection based on the preliminary examination results. The I/O device 1 then transmits the user-determined computational conditions to the mediation unit 21. After that, the user-determined computational conditions are communicated to the duplicate information collection unit 27.

The duplicate information collection unit 27 has the ability to calculate the hash values of the respective multiple files to be examined. As shown in FIG. 7, the duplicate information collection unit 27 is equipped with a duplication condition acquisition unit 271 and a hash value calculation unit 272.

The duplication condition acquisition unit 271 acquires calculation information that defines data employed in hash value calculation for use in duplicate determination in accordance with the file type definition 25 based on the user-determined computational conditions.

Based on the calculation information acquired by the duplication condition acquisition unit 271, the hash value calculation unit 272 identifies data used in hash value calculation for each file to be examined and calculates the hash values of the identified data.

It should be noted that in Embodiment 3 the information analysis unit 23, storage unit 31, and storage unit 32 are similar to the units illustrated in FIG. 3 in Embodiment 2. In addition, the file type definition 25 stored in the storage unit 31, as well as the management DB 24 stored in the storage unit 32, are similar to those illustrated in FIG. 3.

[Device Operation]

Next, the operation of the duplicate file detection device used in Embodiment 3, i.e. the Examining Server 4, will be described with reference to FIG. 8 and FIG. 9. In the description that follows, please refer to FIG. 7 as appropriate. In addition, in Embodiment 3, the duplicate file detection method is carried out by operating the Examining Server 4. Accordingly, a description of the operation of the Examining Server 4, which is provided below, is used instead of a description of the duplicate file detection method.

[Preliminary Information Collection Process]

The preliminary information collection process in the Examining Server 4 will be first described with reference to FIG. 8. First of all, the user enters a preliminary file server examination request addressed to the Examining Server 4 on the I/O device 1. The preliminary examination request contains information regarding the file servers constituting the Group Under Examination 3. It should be noted that the path to the file servers, on which the examination is initiated, as well as the user IDs and passwords required for access, etc., are suggested as the file server-related information.

Figure 8:
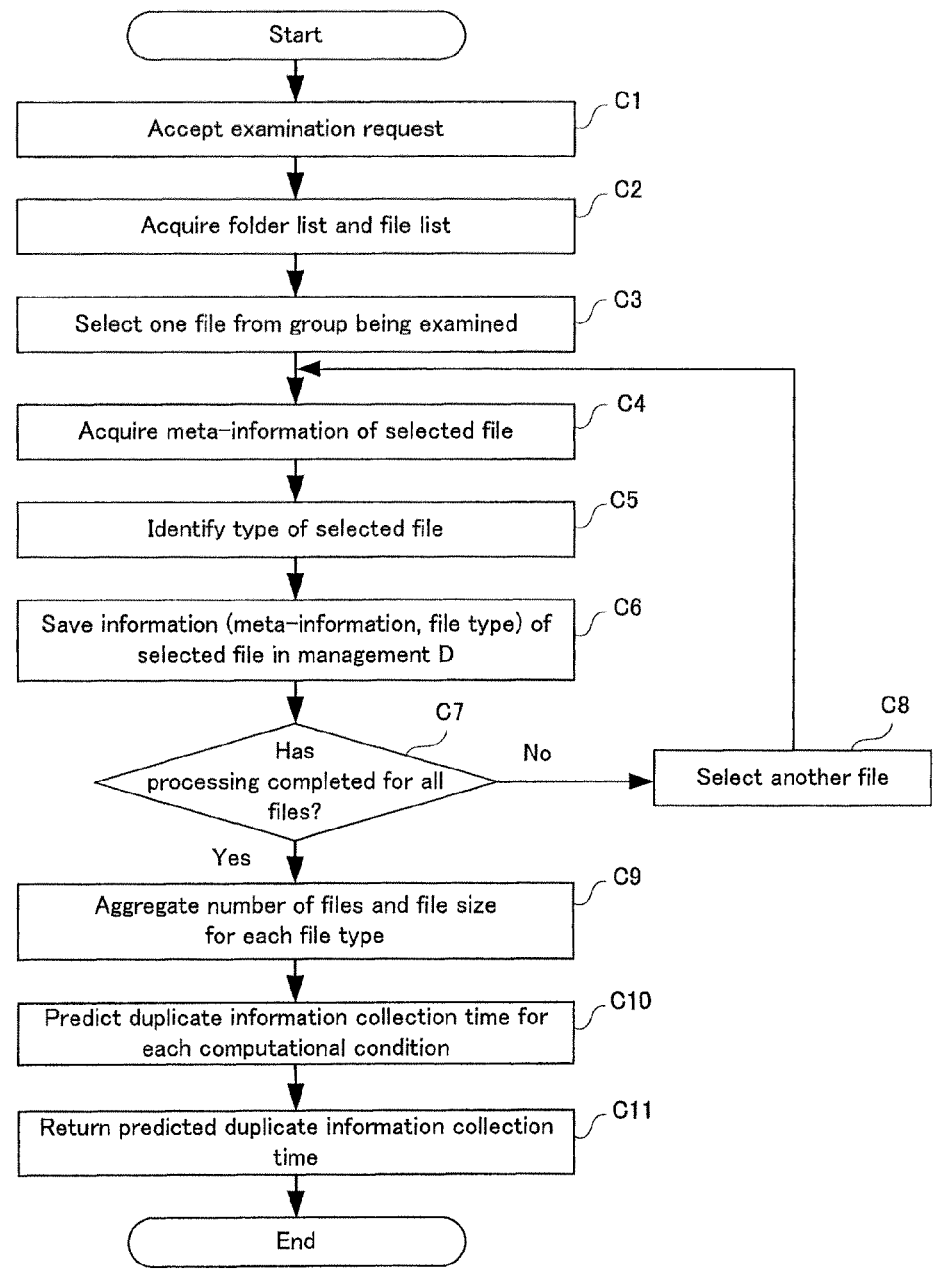
FIG. 8 is a flow hart that describes the execution of the preliminary information collection process by the examining server used as a duplicate file detection device in Embodiment 3 of the present invention.

Then, as shown in FIG. 8, when the I/O device 1 transmits a preliminary examination request to the Examining Server 4, the mediation unit 21 in the Examining Server 4 receives the preliminary examination request and transfers the received preliminary examination request to the preliminary information collection unit 26 (Step C1).

Next, the list acquisition unit 261 in the preliminary information collection unit 26 acquires the folder lists and file lists stored on the file servers constituting the Group Under Examination 3 (Step C2). It should be noted that the acquired folder lists and file lists are saved in the management DB 24.

Next, the meta-information acquisition unit 262 selects a single file to be examined by referring to the folder lists and file lists acquired in Step C2 (Step C3). Furthermore, the meta-information acquisition unit 262 acquires the meta-information of the selected file, for example, its filename (extension), file size, last-updated date/time, and the like (Step C4).

Next, the meta-information acquisition unit 262 identifies the type and, more specifically, the extension of the file selected in Step C3 based on the meta-information acquired in Step C4 (Step C5). Furthermore, the meta-information acquisition unit 262 saves the meta-information acquired in Step C4 and file type identified in Step C5 in the management DB 24 along with the ID (file ID) identifying the selected file (Step C6).

Next, the meta-information acquisition unit 262 refers to the folder lists and file lists acquired in Step C2 and decides whether Steps C4 to C6 have completed for all the files to be examined (Step C7).

If as a result of the decision made in Step C7 it is found that processing has not completed for all the files to be examined, the meta-information acquisition unit 262 selects a new file (Step C8). After that, the steps are carried out again starting from Step C4. On the other hand, if as a result of the decision made in Step C7 it is found that processing has completed for all the files to be examined, the meta-information acquisition unit 262 notifies the collection time prediction unit 263 of the fact.

Next, when the process of meta-information collection for all the examined items completes, the collection time prediction unit 263 acquires the information stored in Step C6 from the management DB 24 and aggregates the file counts and total file sizes for each file type (Step C9).

The collection time prediction unit 263 then sets one, two or more computational conditions for various file types by referring to the file type definition 25 and predicts the duplicate information collection time for each computational condition (Step C10). Here, the prediction of the duplicate information collection time will be described more specifically.

Generally, if the duplicate information collection time is compared with the time required for loading data, the latter one is markedly larger, which is why prediction of the duplicate information collection time is to some extent possible based on the amount of data used for hash calculation and the number of files.

For example, let us assume that there are three types of computational conditions, namely, data used in hash value calculation, set for all the file types, i.e.: (1) only properties, (2) properties and partial data, (3) properties and complete data.

In such a case, the duplicate information collection time for the computational condition (1) depends on the number of files.

In addition, the duplicate information collection time for the computational condition (2) depends on the number of files and the amount of data used as partial data. It should be noted that the amount of partial data differs for each file type.

Furthermore, the duplicate information collection time for the computational condition (3) depends on the number of files and file size. It should be noted that while the file size is different depending on the file, it can be computed based on the total file size for each file type.

When the computational conditions (1), (2), and (3) are used, the collection time prediction unit 263 predicts the duplicate information collection time for each one.

In addition, the duplicate information collection time is subject to the effects of hardware and network specifications. Thus, if the collection time prediction unit 263, upon acquiring data for prediction purposes, calculates a hash value therefor and a comparison is performed with the time required for its calculation, then prediction of duplicate information collection time is improved in terms of accuracy and it becomes more efficient.

Next, after executing Step C10, the preliminary information collection unit 26 transfers the values of the duplicate information collection time predicted depending on the computational condition to the mediation unit 21 as preliminary examination results.

As a result, the Examining Server 2 returns the preliminary examination results to the I/O device 1 via the mediation unit 21 (Step C11). As a result of the above, the preliminary information collection process in the Examining Server 4 is completed.

Consequently, the user determines the computational conditions used for duplicate file detection based on the predicted time provided as the preliminary examination result and enters an examination request including the determined computational conditions on the I/O device 1.

[Duplicate File Detection Process]

Next, the duplicate file detection process in the Examining Server 4 will be described with reference to FIG. 9. First of all, the user enters a file server examination request addressed to the Examining Server 4 on the I/O device 1. User-determined computational conditions are included in the examination request in addition to the information regarding the file servers that constitute the Group Under Examination 3.

Figure 9:
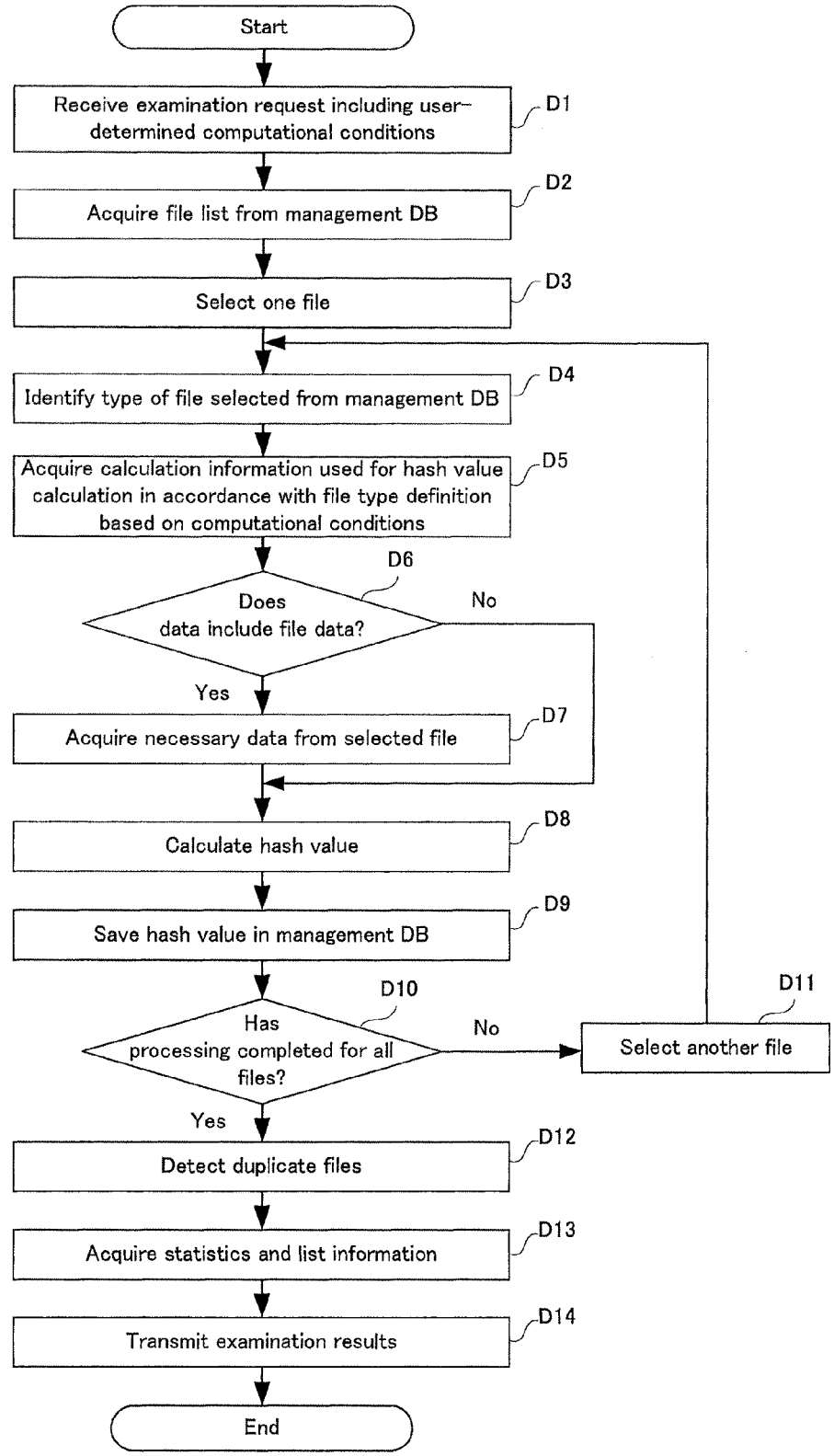
FIG. 9 is a flow chart that describes the execution of the duplicate file detection process by the examining server used as a duplicate file detection device in Embodiment 3 of the present invention.

Then, as shown in FIG. 9, when the I/O device 1 transmits the examination request to the Examining Server 4, the mediation unit 21 in the Examining Server 4 receives the examination request and transfers the received examination request to the duplicate information collection unit 27 (Step D1).

Next, when the duplicate information collection unit 27 receives the examination request, the duplication condition acquisition unit 271 acquires a file list of the files to be examined from the management DB 24 (Step D2). Further, the duplication condition acquisition unit 271 selects a single file by referring to the acquired file list (Step D3). Subsequently, based on the information saved in the management DB in Step C6, the duplication condition acquisition unit 271 identifies the type of the selected file (Step D4).

Next, the duplication condition acquisition unit 271 acquires calculation information that defines data used for hash value calculation in accordance with the file type definition 25 based on the computational conditions provided by the user at the time of the examination request and on the type of the file identified in Step D4 (Step D5).

Next, the duplication condition acquisition unit 271 decides whether the data defined by the calculation information acquired in Step D5 is data (file data) other than the meta-information of the file selected in Step D3 (Step D6).

If as a result of the decision made in Step D6 the data defined by the calculation information acquired in Step D5 is found to be meta-information, the duplication condition acquisition unit 271 notifies the hash value calculation unit 272 of the fact. As a result, the hash value calculation unit 272 calculates a hash value using the meta-information (Step D8). In addition, the hash value calculation unit 272 saves the calculated hash value in the management DB 24 (Step D9).

On the other hand, if as a result of the decision made in Step D6 the data defined by the calculation information acquired in Step D5 is found to be file data, the duplication condition acquisition unit 271 accesses the file selected in Step D3 and acquires the data defined by the calculation information acquired in Step D5, for example, complete file data, N bytes of data from the beginning of the file, etc. (Step D7). After that, the duplication condition acquisition unit 271 transfers the data acquired in Step D7 to the hash value calculation unit 272.

Once Step D7 has been carried out, the hash value calculation unit 272 calculates a hash value using the data transferred from the duplication condition acquisition unit 271 (Step D8). In this case, the hash value calculation unit 272 also saves the calculated hash value in the management DB 24 (Step D9).

Next, upon completion of Step D9, the duplication condition acquisition unit 271 refers to the file list acquired in Step D2 and decides whether processing has completed for all the files to be examined (Step D10).

If as a result of the decision made in Step D10 it is found that processing has not completed for all the files to be examined, the duplication condition acquisition unit 271 selects a new file (Step D11). After that, the steps are carried out again starting from Step D4. On the other hand, if as a result of the decision made in Step D10 it is found that processing has completed for all the files to be examined, the duplicate information collection unit 27 notifies the information analysis unit 23 of the fact.

Upon receiving the notification from the duplicate information collection unit 27, the statistical information processing unit 231 in the information analysis unit 23 accesses the management DB 24, acquires the information saved in Steps C4 and D9, and initiates information analysis. The statistical information processing unit 231 then detects files with mutually matching hash values and identifies them as duplicate files (Step D12).

Next, the statistical information processing unit 231 acquires information such as the number of files with hash values matching those of other files (duplicate file count), individual or total space occupied by the duplicate files (duplicate space), etc., as statistical information (Step D13).

At such time, in order to facilitate analysis by the user on the I/O device 1, the statistical information processing unit 231 can also combine conditions such as folder hierarchy and the type of each file, etc., with the statistical information.

In addition, in Step D13, the list information processing unit 232 acquires a list of the duplicate files and detailed information on each duplicate file, etc. as list information. Further, the information analysis unit 23 outputs the statistical information and list information to the mediation unit 21.

After that, upon receiving the statistical information and list information, the mediation unit 21 generates examination results containing the above-mentioned information and transmits them to the I/O device 1 (Step D14). This allows the user to receive the examination results on the I/O device 1.

[Effects]

As a result of using the above-described configuration and processing, the effects described in Embodiment 2 can be obtained when using Embodiment 3. In addition, the following effects can also be obtained in accordance with Embodiment 3.

In Embodiment 3, the information collection process is divided into two stages. In the preliminary examination stage, examination time is predicted based on number, size, etc. of the files held by the file servers to be examined. Consequently, examination results that are in line with user requirements can be obtained because users can weigh examination time against duplicate detection accuracy and can choose which one takes precedence in each particular case.

[Software Program]

The software program used in Embodiment 3 may be any software program directing a computer to execute Steps C1 to C15 shown in FIG. 8 and Steps D1 to D14 shown in FIG. 9. The Examining Server 4 and duplicate file detection method used in Embodiment 3 can be implemented by installing and running this software program on the computer. In such a case, the CPU (Central Processing Unit) of the computer operates and performs processing as the preliminary information collection unit 26, duplicate information collection unit 27, information analysis unit 23, and mediation unit 21. In addition, the hard disk drive and other storage devices installed in the computer operate as the storage unit 31 and storage unit 32.

Embodiment 4

Next, the duplicate file detection device, duplicate file detection method, and software program used in Embodiment 4 of the present invention will be described with reference to FIG. 10 and FIG. 11.

First of all, it should be noted that the configuration of the duplicate file detection device used in Embodiment 4, i.e. the examining server, is similar to the configuration of the Examining Server 4 used in Embodiment 3, which is illustrated in FIG. 7. However, Embodiment 4 differs from Embodiment 3 in the processing performed by the preliminary information collection unit 26 and duplicate information collection unit 27. In Embodiment 4, the examination time desired by the user is received at the time of the initial examination request and the computational conditions are determined based on this time. Because of this, processing is performed without constraints on user decisions, as in Embodiment 3.

Here, the operation of the duplicate file detection device used in Embodiment 4, i.e. the examining server, will be described with reference to FIG. 10 and FIG. 11. In the description that follows, please refer to FIG. 7 as appropriate.

In addition, in Embodiment 4, the duplicate file detection method is carried out by operating the examining server. Accordingly, a description of the operation of the examining server, which is provided below, is used instead of a description of the duplicate file detection method.

First of all, the user enters a file server examination request addressed to the examining server on the I/O device 1. The examination request contains information regarding the file servers constituting the group under examination. At such time, in Embodiment 4, the user can enter the desired examination time as part of the examination request.

Figure 10:
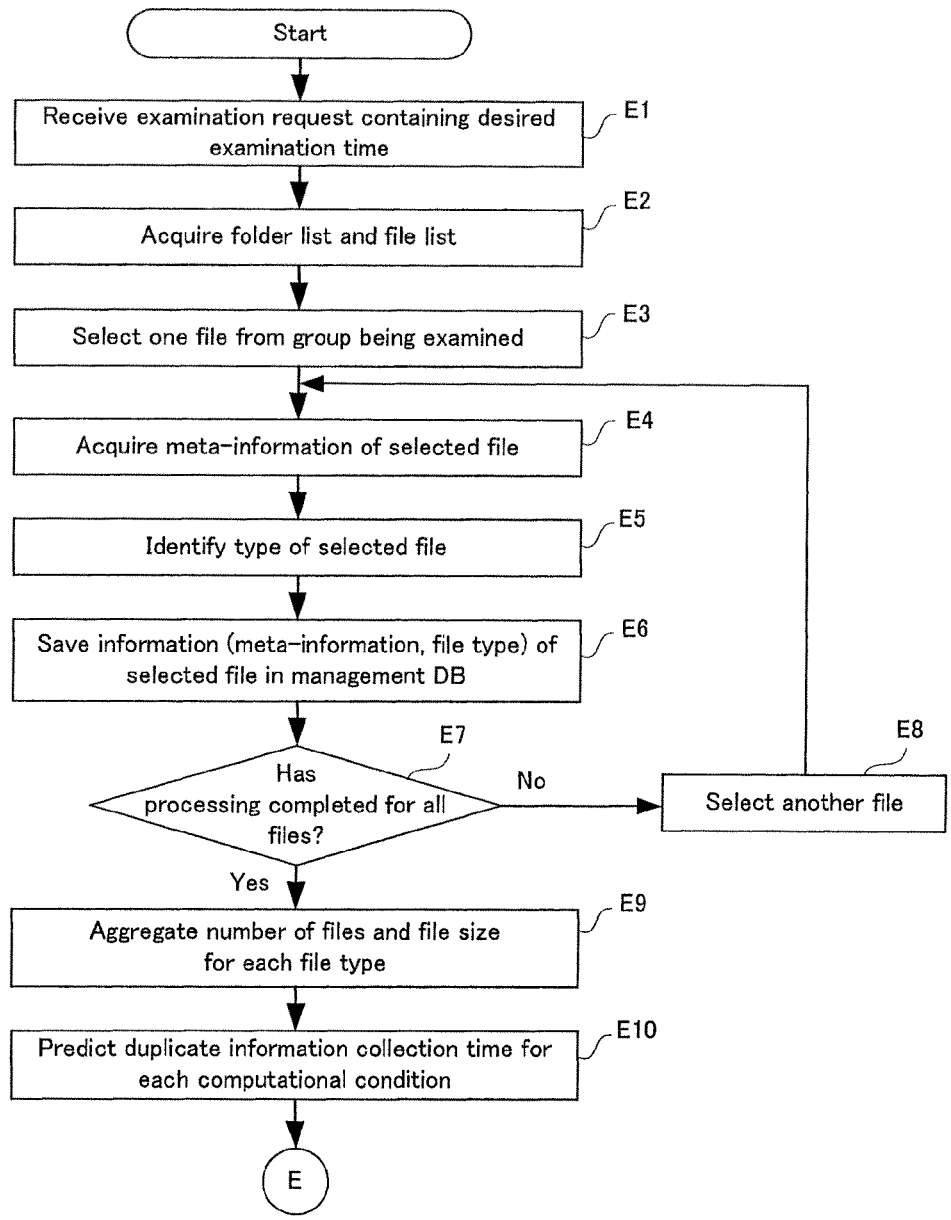
FIG. 10 is a flow chart illustrating the first half of the operation of the duplicate file detection device used in Embodiment 4 of the present invention.

Then, as shown in FIG. 10, when the I/O device 1 transmits the examination request to the examining server, the mediation unit 21 in the examining server receives the examination request and transfers the received examination request to the preliminary information collection unit 26 (Step E1).

Next, the list acquisition unit 261 in the preliminary information collection unit 26 acquires the folder lists and file lists stored on the file servers constituting the Group Under Examination 3 (Step E2). It should be noted that the acquired folder lists and file lists are saved in the management DB 24.

Next, the meta-information acquisition unit 262 selects a single file to be examined by referring to the folder lists and file lists acquired in Step E2 (Step E3). Furthermore, the meta-information acquisition unit 262 acquires the meta-information of the selected file, for example, its filename (extension), file size, last-updated date/time, and the like (Step E4).

Next, the meta-information acquisition unit 262 identifies the type and, more specifically, the extension of the file selected in Step E3 based on the meta-information acquired in Step E4 (Step E5). Furthermore, the meta-information acquisition unit 262 saves the meta-information acquired in Step E4 and file type identified in Step E5 in the management DB 24 along with the ID (file ID) identifying the selected file (Step E6).

Next, the meta-information acquisition unit 262 refers to the folder lists and file lists acquired in Step E2 and decides whether Steps E4 to E6 have completed for all the files to be examined (Step E7).

If as a result of the decision made in Step E7 it is found that processing has not completed for all the files to be examined, the meta-information acquisition unit 262 selects a new file (Step E8). After that, the steps are carried out again starting from Step E4. On the other hand, if as a result of the decision made in Step E7 it is found that processing has completed for all the files to be examined, the meta-information acquisition unit 262 notifies the collection time prediction unit 263 of the fact.

Next, when the process of meta-information collection for all the examined items completes, the collection time prediction unit 263 acquires the information stored in Step E6 from the management DB 24 and aggregates the file counts and total file sizes (Step E9) for each selected file type.

The collection time prediction unit 263 then sets one, two or more computational conditions for various file types by referring to the file type definition 25 and predicts the duplicate information collection time for each computational condition (Step E10). It should be noted that Step E10 illustrated in FIG. 10 is the same step as Step C10 illustrated in FIG. 8.

Next, after executing Step E10, the preliminary information collection unit 26 transfers the values of the duplicate information collection time predicted depending on the computational condition to the duplicate information collection unit 27.

Figure 11:
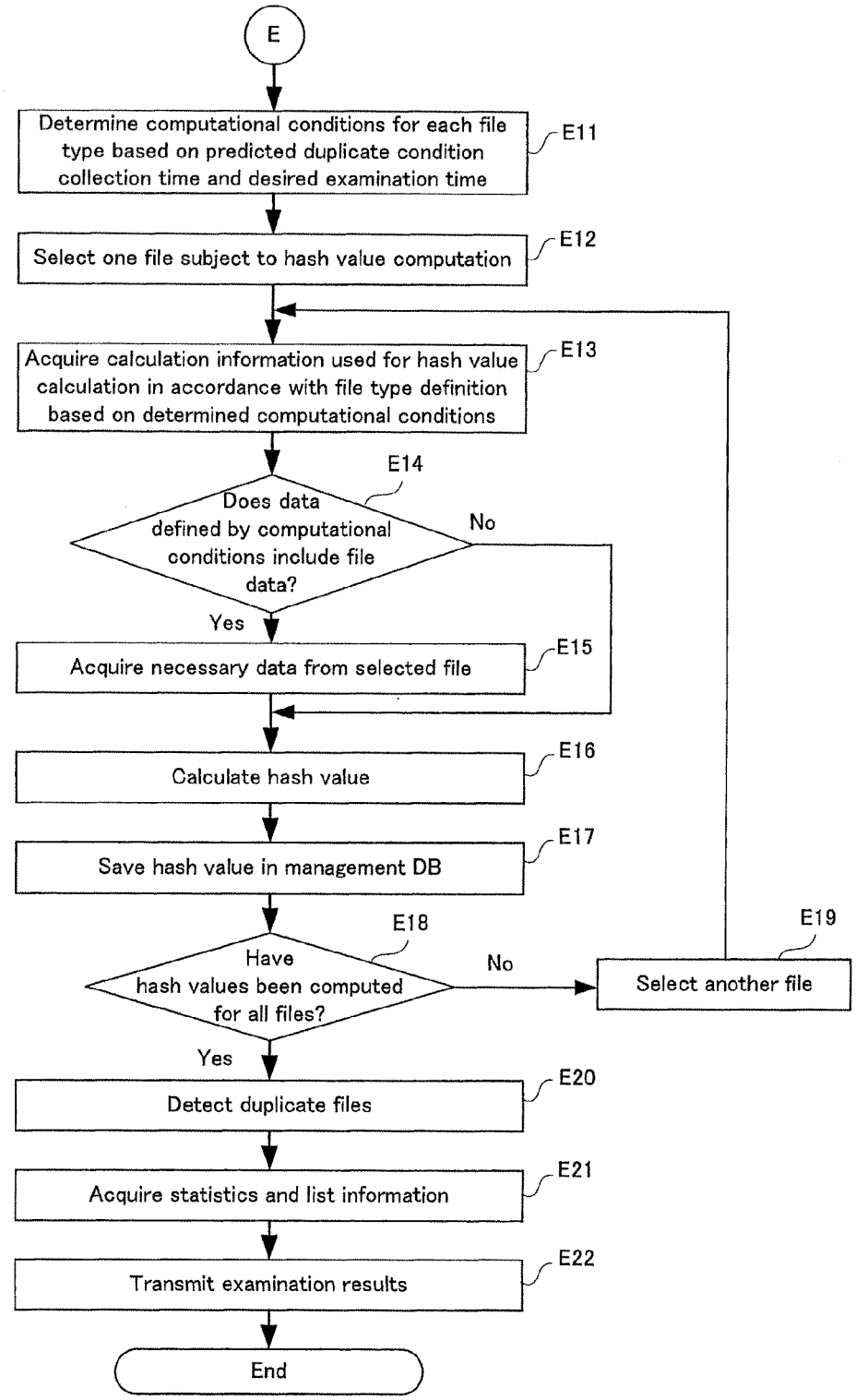
FIG. 11 is a flow chart illustrating the second half of the operation of the duplicate file detection device used in Embodiment 4 of the present invention.

As shown in FIG. 11, when the duplicate information collection unit 27 receives the expected values, the duplication condition acquisition unit 271 determines the computational conditions to be used for each file type based on the desired examination time entered by the user when the examination request is made and the duplicate collection time predicted in Step E10 (Step E11). Specifically, the duplication condition acquisition unit 271 determines the computational conditions such that the duplicate collection time is brought closer to the desired examination time.

Next, the duplication condition acquisition unit 271 acquires a file list of the files to be examined from the management DB 24 and selects a single file for hash value computation by referring to the acquired file list (Step E12).

Next, based on the information saved in the management DB in Step E6, the duplication condition acquisition unit 271 identifies the type of the selected file. The duplication condition acquisition unit 271 then acquires calculation information that defines data used for hash value calculation in accordance with the file type definition 25 based on the determined computational conditions corresponding to the type of the identified file (Step E13).

Next, the duplication condition acquisition unit 271 decides whether the data defined by the calculation information acquired in Step E13 is data (file data) other than the meta-information of the file selected in Step E12 (Step E14).

If as a result of the decision made in Step E14 the data defined by the calculation information acquired in Step E13 is found to be meta-information, the duplication condition acquisition unit 271 notifies the hash value calculation unit 272 of the fact. As a result, the hash value calculation unit 272 calculates a hash value using the meta-information (Step E16). In addition, the hash value calculation unit 272 saves the calculated hash value in the management DB 24 (Step E17).

On the other hand, if as a result of the decision made in Step E14 the data defined by the calculation information acquired in Step E13 is found to be file data, the duplication condition acquisition unit 271 accesses the file selected in Step E12 and acquires the data defined by the calculation information acquired in Step E13, for example, complete file data, N bytes of data from the beginning of the file, etc. (Step E15). After that, the duplication condition acquisition unit 271 transfers the data acquired in Step E15 to the hash value calculation unit 272.

Once Step E15 has been carried out, the hash value calculation unit 272 calculates a hash value using the data transferred from the duplication condition acquisition unit 271 (Step E16). In this case, the hash value calculation unit 272 also saves the calculated hash value in the management DB 24 (Step E17).

Next, upon completion of Step E17, the duplication condition acquisition unit 271 refers to the file list acquired in Step E2 and decides whether hash values have been computed for all the files to be examined (Step E18).

If as a result of the decision made in Step E18 it is found that processing has not completed for all the files to be examined, the duplication condition acquisition unit 271 selects a new file (Step E19). After that, the steps are carried out again starting from Step E13. On the other hand, if as a result of the decision made in Step E18 it is found that processing has completed for all the files to be examined, the duplicate information collection unit 27 notifies the information analysis unit 23 of the fact.

Upon receiving the notification from the duplicate information collection unit 27, the statistical information processing unit 231 in the information analysis unit 23 accesses the management DB 24, acquires the information saved in Steps E6 and E17, and initiates information analysis. The statistical information processing unit 231 then detects files with mutually matching hash values and identifies them as duplicate files (Step E20).

Next, the statistical information processing unit 231 acquires information such as the number of files with hash values matching those of other files (duplicate file count), individual or total space occupied by the duplicate files (duplicate space), etc., as statistical information (Step E21).

At such time, in order to facilitate analysis by the user on the I/O device 1, the statistical information processing unit 231 can also combine conditions such as folder hierarchy and the type of each file, etc., with the statistical information.

In addition, in Step E21, the list information processing unit 232 acquires a list of the duplicate files and detailed information on each duplicate file, etc. as list information. After that, the information analysis unit 23 outputs the statistical information and list information to the mediation unit 21.

Subsequently, upon receiving the statistical information and list information, the mediation unit 21 generates examination results containing the above-mentioned information and transmits them to the I/O device 1 (Step E22). This allows the user to receive the examination results on the I/O device 1.

[Effects]

As described above, in Embodiment 4, when the user enters the desired examination time, the optimal set of data for hash value calculation can be automatically set by the device using the desired examination time as a reference. For this reason, Embodiment 4 makes it possible to keep the examination time constant while changing the accuracy of duplicate detection.

[Software Program]

The software program used in Embodiment 4 may be any software program directing a computer to execute Steps E1 to E22 illustrated in FIG. 10. The examining server and duplicate file detection method used in Embodiment 4 can be implemented by installing and running this software program on the computer. In such a case, the CPU (Central Processing Unit) of the computer operates and performs processing as the preliminary information collection unit 26, duplicate information collection unit 27, information analysis unit 23, and mediation unit 21. In addition, the hard disk drive and other storage devices installed in the computer operate as the storage unit 31 and storage unit 32.

[Computer]

Figure 12:
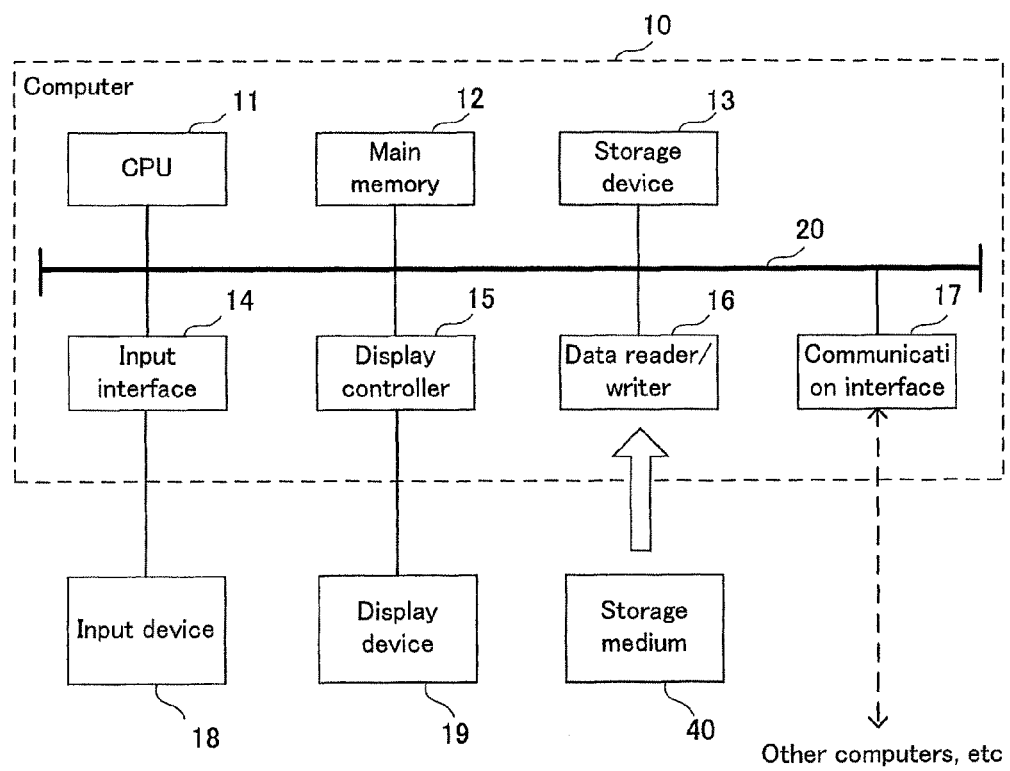
FIG. 12 is a block diagram illustrating an exemplary computer implementing the duplicate file detection device (examining server) used in Embodiment 1 through Embodiment 4 of the present invention.

Here, the computer used to implement the duplicate file detection device (examining server) by running the software program used in Embodiment 1 to Embodiment 4 will be described with reference to FIG. 12. FIG. 12 is a block diagram illustrating an exemplary computer implementing the duplicate file detection device (examining server) used in Embodiment 1 through Embodiment 4 of the present invention.

As shown in FIG. 12, the computer 10 comprises a CPU 11, a main memory 12, a storage device 13, an input interface 14, a display controller 15, a data reader/writer 16, and a communication interface 17. These components are interconnected through a bus 20 so as to permit mutual communication of data.

The CPU 11 loads the software programs (code) used in the embodiments, which are stored in the storage device 13, into the main memory 12 and performs various operations by executing them in a predetermined order. The main memory 12 is typically a volatile storage device, such as a DRAM (Dynamic Random Access Memory), etc.

In addition, the software programs are supplied on computer-readable storage media 40. It should be noted that the software programs may be distributed via the Internet, which is connected through the communication interface 117.

In addition to hard disk drives, semiconductor storage devices such as flash memory etc. are suggested as specific examples of the storage device 13. The input interface 14 mediates the transmission of data between the CPU 11 and an input device 18, such as a keyboard or a mouse.

The display controller 15 is connected to a display device 19 and controls display on the display device 19. The data reader/writer 16, which mediates the transmission of data between the CPU 11 and the storage media 40, reads the software programs from the storage media 40 and writes the processing results of the computer 10 to the storage media 40. The communication interface 17 mediates the transmission of data between the CPU 11 and other computers.

In addition, general-purpose semiconductor storage devices such as CF (Compact Flash) and SD (Secure Digital), etc., as well as magnetic storage media, such as floppy disks (Flexible Disk), or optical storage media such as CD-ROMs (Compact Disk Read Only Memory) are suggested as specific examples of the storage media 40.

The whole or part of the exemplary embodiments disclosed above can be described as, but not limited to, the following supplementary notes.

(Supplementary Note 1)

A duplicate file detection device comprising:

a storage unit that stores information defining data used for calculating hash values of files in association with extensions of the files;

a calculation unit that acquires the information associated with the extensions of the respective multiple files to be examined from the storage unit and uses the acquired information to calculate the hash values of the respective multiple files to be examined; and a detection unit that detects duplicated files by comparing the hash values of the respective multiple files to be examined that are calculated by the calculation unit.

(Supplementary Note 2)

The duplicate file detection device according to Supplementary note 1, wherein the data used in the calculation of the hash values of the files includes data that is modified when the corresponding files are updated.

(Supplementary Note 3)

The duplicate file detection device according to Supplementary note 1, wherein the data used in the calculation of the hash values of the files is different for each extension with which the information that defines the data is associated.

(Supplementary Note 4)

The duplicate file detection device according to Supplementary note 1, wherein the data used in the calculation of the hash values of the files is selected from identifiers of the files, extensions of the files, numerical values indicating sizes of the files, date/time the files were last updated, the files in the entirety thereof, or specific portions of the files.

(Supplementary Note 5)

The duplicate file detection device according to Supplementary note 1, wherein the storage unit stores information defined as a complete version of a file as information used when the data size of said file does not exceed a threshold value and stores information defined as a specific portion of a file as information used when the data size of said file exceeds the threshold value.

(Supplementary Note 6)

The duplicate file detection device according to Supplementary note 1, wherein there is further comprised a second storage unit that stores hash values calculated by the calculation unit for the respective multiple files to be examined and the detection unit detects duplicated files using the hash values stored in the second storage unit.

(Supplementary Note 7)

The duplicate file detection device according to Supplementary note 1, wherein there is further comprised a mediation unit that receives an examination request containing information regarding the file servers that hold the multiple files to be examined from an external device and sends the received examination request to the calculation unit;

the calculation unit acquires the multiple files to be examined from the file servers identified in the examination request and calculates hash values for each of the acquired multiple files;

the detection unit, upon detection of duplicated files, sends the detection results to the mediation unit; and the mediation unit transmits examination results containing the detection results sent from the detection unit to the external device.

(Supplementary Note 8)

A duplicate file detection method comprising the steps of:

(a) storing information that defines data used for calculating hash values of files in association with extensions of the files;

(b) acquiring the information associated with the extensions of the respective multiple files to be examined and using the acquired information to calculate the hash values of the respective multiple files to be examined; and (c) detecting duplicated files by comparing the hash values of the respective multiple files to be examined that are calculated in Step (b) above.

(Supplementary Note 9)

The duplicate file detection method according to Supplementary note 8, wherein the data used in the calculation of the hash values of the files includes data that is modified when the corresponding files are updated.

(Supplementary Note 10)

The duplicate file detection method according to Supplementary note 8, wherein the data used in the calculation of the hash values of the files is different for each extension with which the information that defines the data is associated.

(Supplementary Note 11)

The duplicate file detection method according to Supplementary note 8, wherein the data used in the calculation of the hash values of the files is selected from identifiers of the files, extensions of the files, numerical values indicating sizes of the files, date/time the files were last updated, the files in the entirety thereof, or specific portions of the files.

(Supplementary Note 12)

The duplicate file detection method according to Supplementary note 8, wherein in Step (a) above, information defined as a complete version of a file is stored as information used when the data size of said file does not exceed a threshold value and information defined as a specific portion of a file is stored as information used when the data size of said file exceeds the threshold value.

(Supplementary Note 13)

The duplicate file detection method according to Supplementary note 8, wherein there is further comprised the step (d) of storing hash values calculated in Step (c) above for the respective multiple files to be examined and, in Step (c), the duplicated files are detected using the hash values stored in Step (d) above.

(Supplementary Note 14)

The duplicate file detection method according to Supplementary note 8, wherein:

there is further comprised the step (e) of receiving an examination request containing information regarding the file servers that hold the multiple files to be examined from an external device;

in Step (b) above, the multiple files to be examined are acquired from the file servers identified in the examination request and hash values are calculated respectively for each of the acquired multiple files; and in Step (c) above, examination results containing the detection results are transmitted to the external device.

(Supplementary Note 15)

A computer-readable storage medium having recorded thereon a software program containing instructions directing a computer to execute the steps of:

(a) storing information that defines data used for calculating hash values of files in association with extensions of the files;

(b) acquiring the information associated with the extensions of the respective multiple files to be examined and using the acquired information to calculate the hash values of the respective multiple files to be examined; and (c) detecting duplicated files by comparing the hash values of the respective multiple files to be examined that are calculated in Step (b) above.

(Supplementary Note 16)

The computer-readable storage medium according to Supplementary note 15, wherein the data used in the calculation of the hash values of the files includes data that is modified when the corresponding files are updated.

(Supplementary Note 17)

The computer-readable storage medium according to Supplementary note 15, wherein the data used in the calculation of the hash values of the files is different for each extension with which the information that defines the data is associated.

(Supplementary Note 18)

The computer-readable storage medium according to Supplementary note 15, wherein the data used in the calculation of the hash values of the files is selected from identifiers of the files, extensions of the files, numerical values indicating sizes of the files, date/time the files were last updated, the files in the entirety thereof, or specific portions of the files.

(Supplementary Note 19)

The computer-readable storage medium according to Supplementary note 15, wherein in Step (a) above, information defined as a complete version of a file is stored as information used when the data size of said file does not exceed a threshold value and information defined as a specific portion of a file is stored as information used when the data size of said file exceeds the threshold value.

(Supplementary Note 20)

The computer-readable storage medium according to Supplementary note 15, wherein there are further included instructions directing the computer to execute the step (d) of storing hash values calculated in Step (c) above for the respective multiple files to be examined, and, in Step (c), the duplicated files are detected using the hash values stored in Step (d) above.

(Supplementary Note 21)

The computer-readable storage medium according to Supplementary note 15, wherein:

there are further comprised instructions directing the computer to execute the step (e) of receiving an examination request containing information regarding the file servers that hold the multiple files to be examined from an external device;

in Step (b) above, the multiple files to be examined are acquired from the file servers identified in the examination request and hash values are calculated respectively for each of the acquired multiple files; and in Step (c) above, examination results containing the detection results are transmitted to the external device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A duplicate file detection device comprising:
a storage unit that stores information defining data used for calculating hash values of files for each extension of the files;
a calculation unit that acquires information corresponding to extensions of each of a plurality of files to be examined from the storage unit and uses the acquired information to calculate hash values of each of the plurality of files to be examined; and
a detection unit that detects duplicated files by comparing the hash values of each of the plurality of files to be examined that are calculated by the calculation unit; and
a mediation unit that receives an examination request containing information regarding the file servers that hold the plurality of files to be examined from an external device and sends the received examination request to the calculation unit,
wherein said data used for calculating said hash values is set for said each extension of the files in advance,
wherein the storage unit stores information comprising a complete version of a file as information used when a data size of said file does not exceed a threshold value and stores information defined as a specific portion of a file as information used when the data size of said file exceeds the threshold value,
wherein the calculation unit acquires the plurality of files to be examined from the file servers identified in the examination request and calculates hash values for each of the acquired plurality of files,
wherein the detection unit, upon detection of duplicated files, sends the detection results to the mediation unit, and
wherein the mediation unit transmits examination results containing the detection results sent from the detection unit to the external device.

2. The duplicate file detection device according to claim 1, wherein the data used in the calculation of the hash values of the files includes data that is modified when the corresponding files are updated.

3. The duplicate file detection device according to claim 1, wherein the data used in the calculation of the hash values of the files is different for each extension to which the information that defines the data corresponds.

4. The duplicate file detection device according to claim 1, wherein the data used in the calculation of the hash values of the files is selected from one or more of identifiers of the files, extensions of the files, numerical values indicating sizes of the files, date/time the files were last updated, the files in the entirety thereof, and specific portions of the files.

5. The duplicate file detection device according to claim 1, further comprising a second storage unit that stores hash values calculated by the calculation unit for each of the plurality of files to be examined and the detection unit detects duplicated files using the hash values stored in the second storage unit.

6. A duplicate file detection method comprising:
(a) storing information that defines data used for calculating hash values of files for each extension of the files;
(b) acquiring the information corresponding to extensions of each of a plurality of files to be examined and using the acquired information to calculate hash values of each of the plurality of files to be examined; and
(c) detecting duplicated files by comparing the hash values of each of the plurality of files to be examined that are calculated in said acquiring;
(d) storing hash values calculated in said detecting for each of the plurality of files to be examined and, in said detecting, the duplicated files are detected using the hash values stored in said storing hash values; and
(e) receiving an examination request containing information regarding the file servers that hold the plurality of files to be examined from an external device,
wherein said data used for calculating said hash values is set for said each extension of the files in advance,
wherein in said storing, information comprising a complete version of a file is stored as information used when a data size of said file does not exceed a threshold value and information defined as a specific portion of a file is stored as information used when the data size of said file exceeds the threshold value,
wherein in said acquiring, the plurality of files to be examined are acquired from the file servers identified in the examination request and hash values are calculated respectively for each of the plurality of acquired files, and
wherein in said detecting, examination results containing the detection results are transmitted to the external device.

7. The duplicate file detection method according to claim 6, wherein the data used in the calculation of the hash values of the files includes data that is modified when the corresponding files are updated.

8. The duplicate file detection method according to claim 6, wherein the data used in the calculation of the hash values of the files is different for each extension to which the information that defines the data corresponds.

9. The duplicate file detection method according to claim 6, wherein the data used in the calculation of the hash values of the files is selected from one or more of identifiers of the files, extensions of the files, numerical values indicating sizes of the files, date/time the files were last updated, the files in the entirety thereof, and specific portions of the files.

10. A non-transitory machine-readable storage medium having recorded thereon a software program containing instructions directing a computer to execute:
(a) storing information that defines data used for calculating hash values of files for each extension of the files;
(b) acquiring the information corresponding to extensions of each of a plurality of files to be examined and using the acquired information to calculate hash value of each of the plurality of files to be examined; and
(c) detecting duplicated files by comparing the hash values of each of the plurality of files to be examined that are calculated in said acquiring, and
(d) storing the hash values calculated in said detecting for each of the plurality of files to be examined, and, in said detecting the duplicated files are detected using the hash values stored in said storing of said hash values, wherein said data used for calculating said hash values is set for said each extension of the files in advance, wherein the data used in the calculation of the hash values of the files is different for each extension with which the information that defines the data is associated, and wherein in said storing, information comprising a complete version of a file is stored as information used when a data size of said file does not exceed a threshold value and information defined as a specific portion of a file is stored as information used when the data size of said file exceeds the threshold value.

11. The non-transitory machine-readable storage medium according to claim 10, wherein the data used in the calculation of the hash values of the files includes data that is modified when the corresponding files are updated.

12. The non-transitory machine-readable storage medium according to claim 10, wherein the data used in the calculation of the hash values of the files is selected from one or more of identifiers of the files, extensions of the files, numerical values indicating sizes of the files, date/time the files were last updated, the files in the entirety thereof, and specific portions of the files.

* * * * *